United States Patent [19]
Goldsberry

[11] 3,854,663
[45] Dec. 17, 1974

[54] CONSTANT DENSITY REGULATOR
[75] Inventor: Fred L. Goldsberry, Dallas, Tex.
[73] Assignee: Lone Star Gas Company, Dallas, Tex.
[22] Filed: Oct. 2, 1972
[21] Appl. No.: 293,821

[52] U.S. Cl............ 236/92 C, 137/468, 137/505.46
[51] Int. Cl. .......................................... G05d 23/12
[58] Field of Search......... 137/468, 505.41, 505.42, 137/505.46; 236/93, 101, 102, 92 R, 99

[56] References Cited
UNITED STATES PATENTS

| | | | |
|---|---|---|---|
| 890,238 | 6/1908 | Kenton | 137/599 X |
| 2,263,611 | 11/1941 | Carnes | 137/505.46 X |
| 2,320,886 | 6/1943 | Quiroz | 137/505.42 X |
| 2,469,038 | 5/1949 | Winkler | 236/92 R |
| 2,601,745 | 7/1952 | Cruzan | 137/505.38 |
| 2,650,607 | 9/1953 | Bryant | 137/468 |
| 2,662,547 | 12/1953 | Comeau | 137/468 |
| 2,855,951 | 10/1958 | Orth | 137/505.43 |
| 2,918,930 | 12/1959 | Jansen | 137/505.42 X |
| 3,044,486 | 7/1962 | Miller | 137/505.42 |
| 3,252,324 | 5/1966 | Steele | 236/92 R |
| 3,319,649 | 5/1967 | Cummins | 137/505.42 X |

*Primary Examiner*—Harold W. Weakley
*Attorney, Agent, or Firm*—Howard E. Moore

[57] ABSTRACT

A constant density throttling valve which will deliver low pressure gas at a constant density theoretically independent of temperature. It is primarily useful in the metering of gases to positive displacement measuring devices. It may have other applications in process control where the measurement of mass flow of gases is of prime importance such as in chemical processes, nitrogen injection, servo pressure regulators, etc. It employs a sealed bellows diaphragm which contains a controlled volume of gas which actuates a check valve. Means is provided for adjusting the volume of the bellows by an adjustment screw, or control bellows inside the actuating bellows, which in turn determines the flow density of the gas coming through the check valve. The discharge density may be set by using a standard discharge and then adjusting the actuating bellows until the valve controlled thereby is about to open so that the valve will automatically discharge to the lower pressure side at the density selected. A variation of this construction provides an upwardly opening auxiliary valve responsive to downstream pressure to cause instantaneous admission of upstream pressure to the actuating bellows after being subjected to a preset opening pressure. Provision is made for calibration of the constant density throttling valve at the factory and for the subsequent adjustment thereof to compensate for varying input pressures. It may be used for regulation of any gas so long as the control volume in the bellows contains the same gas. Operation is independent of the upstream pressure.

11 Claims, 4 Drawing Figures

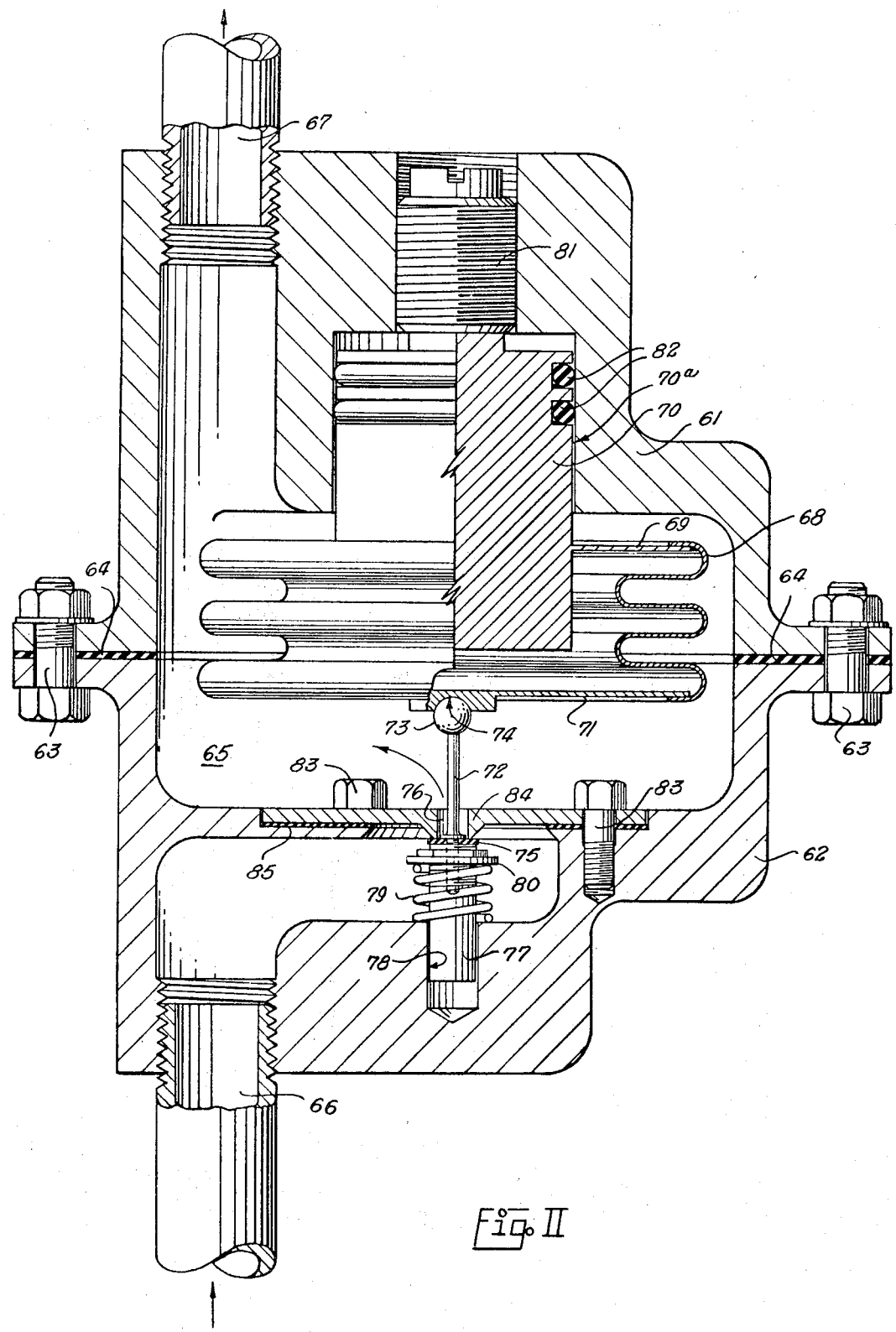
Fig. II

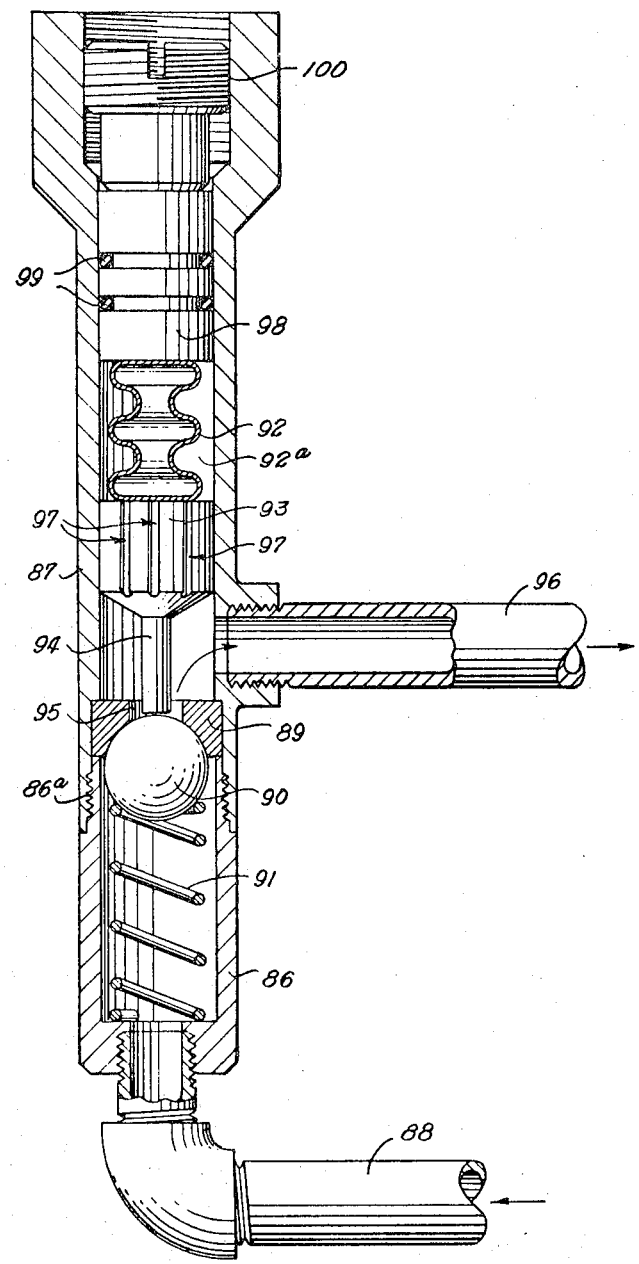
Fig. III

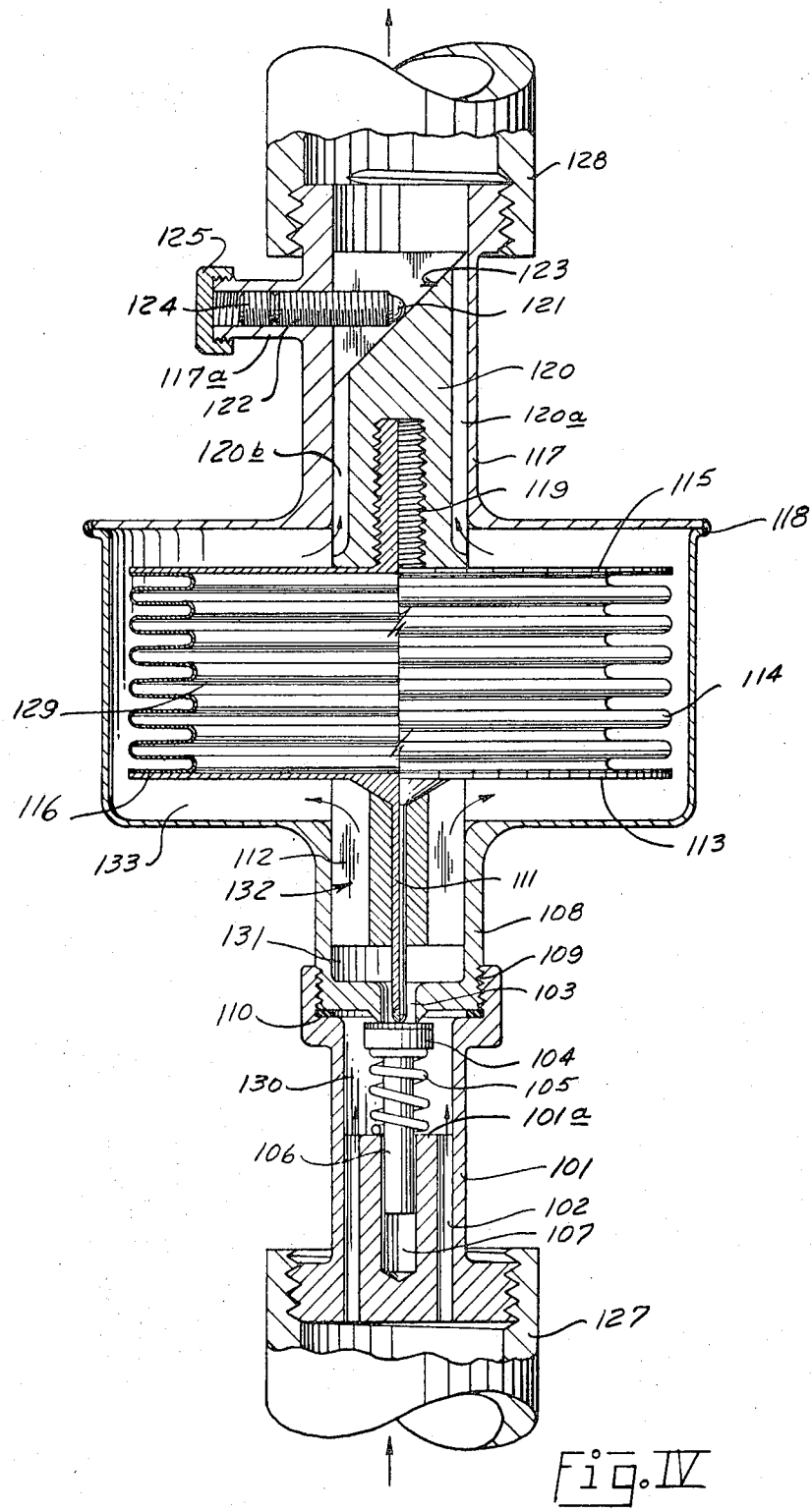
Fig. IV

CONSTANT DENSITY REGULATOR

BACKGROUND OF THE INVENTION

Measurement of gases has been traditionally done by using a volumetric measurement and assumed density wherein the volume was measured based upon the expansion and contraction of a diaphragm responsive to the volume of gas to which it is subjected without any consideration of the density factor. Since density is directly related to pressure and temperature an element of inaccuracy enters into such measurements. This invention is primarily intended to overcome this problem.

DESCRIPTION OF THE INVENTION

The present invention came about by reason of the investigation of the need for a constant density regulator of low pressure gas supplied to residential gas meters to compensate for such inaccuracies in measurement.

The present invention employs as a control element a hermetically sealed sylphon bellows diaphragm charged with the gas to be regulated as the actuating control element. It is employed to actuate a valve between the high pressure gas and the low pressure discharge which flows past the bellows sealed with the same gas. Since the control gas in the bellows and the controlled gas is of the same composition, and the very thin wall of the sylphon bellows, presents no appreciable separation from the control gas and the controlled gas, the temperature and pressure on the inside and outside are equalized with the result that the pressure, and hence the density, remains the same. Therefore, the density of the discharged gas from the high pressure supply to the low pressure discharge to the meter remains constant.

Since it involves the utilization of certain mechanical devices in the operation of the regulator certain adjustment features are incorporated in the device in order to compensate for mechanical losses, such as friction, spring forces, etc.

The device utilizes the basic laws of state for gas. It concerns itself only with conditions on the downstream side of the valve in that a hermetically sealed quantity of gas in the bellows of known mass and volume is submerged in the exhaust stream of the flow of controlled gas. This allows heat transfer to take place between the sealed quantity of gas and the gas discharged from the valve. The bellows is placed between an adjustment screw or adjustment bellows and an actuating plunger which operates a valve in outward opening condition. When demand is placed on the regulator by opening a valve downstream the pressure on the exhaust side of the regulator drops, causing gas inside the bellows to expand which pushes on the valve control stem, opening the valve, and allowing gas to flow therethrough from the high pressure supply into the low pressure discharge. When the gas density rises sufficiently the bellow contracts and allows the valve to close. The valve operates on pressure and allows the valve to close. The valve operates on pressure entirely within the system and not in accordance with predetermined gauge pressures as in other pressure regulators. In this device the temperature of the gas in the bellows is the same as the temperature of the gas at the discharge of the valve since it is completely submerged in the gas and is of the same type of gas. The flow through the valve is controlled by the controlled distance or the control volume of the bellows since the gas in the bellows has a constant mass. Since the control volume is a constant for opening the valve seat there is a constant density of gas inside the bellows, and since the temperature of gas inside the bellows is the same as the discharge temperature the pressure inside the regulator changes with the temperature while the density of the gas stream remains constant. This permits a simple displacement meter downstream of the regulator to measure the volume coming through the valve. Since the density of the gas going through the meter is controlled the flow rate through the meter is accurately determined. This greatly simplifies the metering function in that in present methods electrical control devices, pressure transducers and thermocouples are utilized to determine pressure and temperature in the flow stream which must be compensated for, and reference must be made to a databank for its operation, and computation of the mass flow rate to the meter.

In the present device the mass density of the gas is controlled. The only effect that the high pressure side of the valve has in the valve's operation is to control the force necessary to open the valve, which can be corrected by using a double-seated valve which uses a pressure balance on either side of two valve seats as hereinafter described. In such instance, one pressure tends to hold the valve open and the other tends to hold the valve shut to neutralize each other so that the valve seat opening force which is overcome by the bellows is merely that of a seating spring used to hold the valve shut. Thus, there is provided a control valve for use in the measurement of gas which is simple and permits a much better and more accurate gas meter to be utilized for the benefit of both the supplier and the customer.

Other and further objects of the invention will become apparent upon reading the detailed specification hereinafter following and by referring to the attached drawings.

DESCRIPTION OF THE DRAWINGS

Suitable embodiments of the invention are shown in the attached drawings wherein:

FIG. I is a cross-sectional elevational view of a preferred embodiment of the invention;

Figure 1:
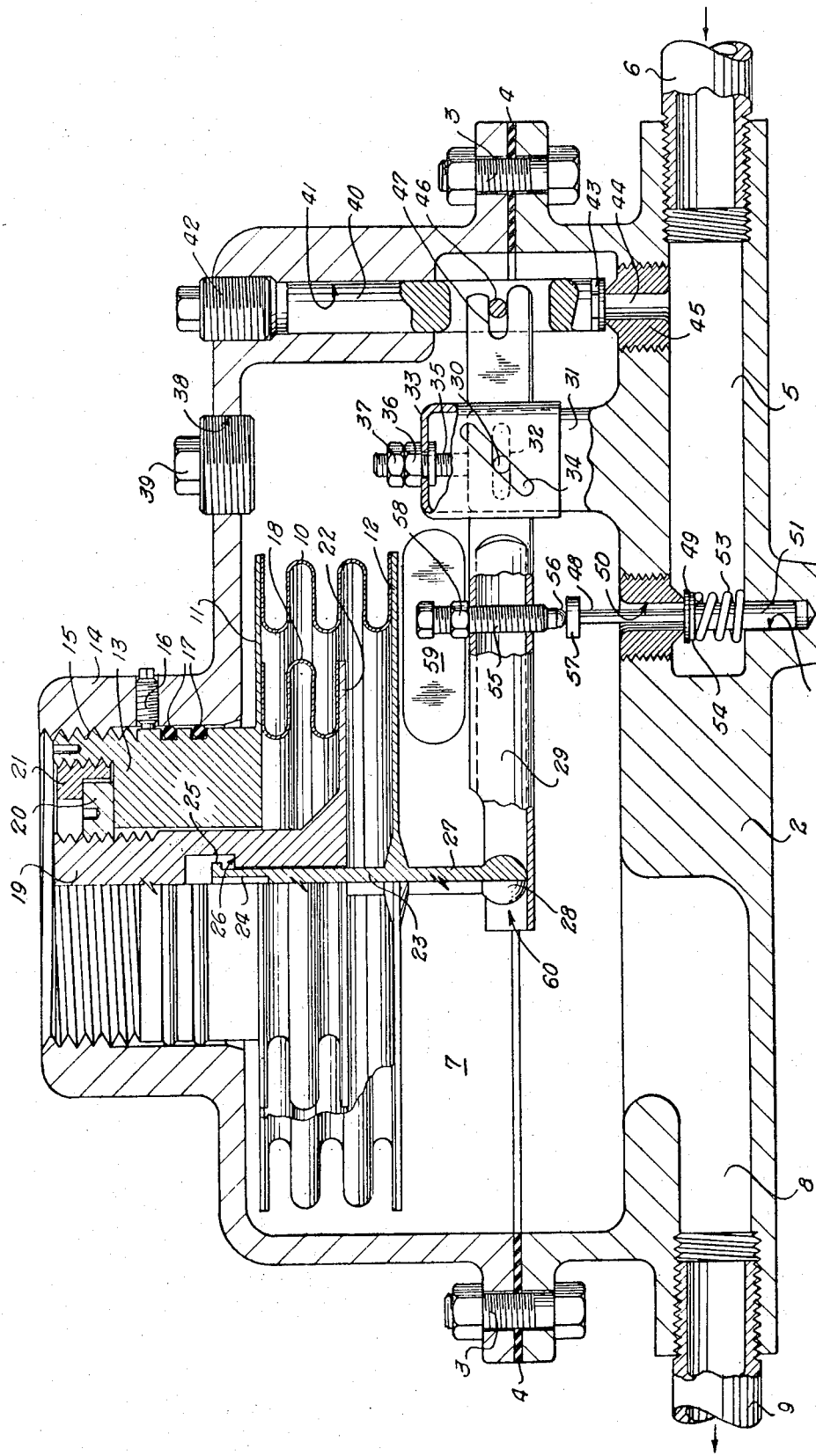

FIG. II is a cross-sectional elevational view of a first alternate form of the invention;

FIG. III is a cross-sectional elevational view of a second alternate form of the invention; and FIG. IV is a cross-sectional elevational view of a third alternate form of the invention.

DESCRIPTION OF A PREFERRED EMBODIMENT

A preferred embodiment of the invention is shown in FIG. I in which the numerals 1 and 2 indicate the upper and lower sections of the casing or housing for the device, which are joined together by a plurality of bolts 3 passing through outwardly extending flanges on the respective housing sections. The interior of the housing is sealed by an appropriate resilient gasket 4 compressed between the flanges. The upstream manifold passage 5 is formed in the housing which communicates with an upstream high pressure intake pipe 6.

A chamber 7 is formed within the housing which communicates with a downstream manifold passage 8 which in turn communicates with a downstream discharge conduit 9.

A thin walled sylphon control bellows diaphragm 10 is sealingly secured to the upper mounting plate 11 and is sealingly secured at its lower end to the thrust plate 12.

An adjusting body 13 to which the flange 11 is integrally attached is threadedly engaged in the boss 14 by the corresponding threads 15, and is retained in adjusted position by a set screw 16.

O-ring seals 17 are disposed in appropriate grooves extending about the adjusting body 13 to seal between the inner surface of the boss 14 and the outer surface of the adjusting body 13. The compression of the active bellows diaphragm 10 may be adjusted by threading the adjusting body 13 inwardly or outwardly of the boss 14 and setting it in adjusted position by the set screw 16.

An adjustment bellows diaphragm 18 is secured at its upper end to the lower surface of the mounting plate 11 and at its lower end to the plate or flange 22 which is integrally formed with the guide body 19.

The guide body 19 movably extends through the adjusting body 13 and is threadedly engaged at its upper end to the adjustment nut 20, which is seated on a shoulder provided at the upper end of the adjusting body 13. The adjustment nut 20 may be rotated to move the guide body 19 inwardly or outwardly of the adjusting body 13 to thereby adjust the compression of the control bellows 18. After adjustment it may be locked in place by the lock nut 21 which is threadedly engaged interiorally of the upper end of the adjusting body 13. By expanding or contracting the bellows 18 to the volume of the bellows 10 may be adjusted, thereby adjusting the volume and density of gas in the actuating bellows 10. The actuating bellows 10 is charged prior to sealing same to the plates 11 and 12 by the same gas as is being controlled. Bellows 18 is not charged with gas but is simply used as a volume control for the actuating bellows 10.

A plunger 23 extends through and is integral with the lower plate 12 and freely extends through the central passage provided through the guide body 19. The upper end of the plunger 23 is provided with a plurality of spring prongs 24 each having a shoulder 25 on the upper end thereof which may be contracted to move same through the bore 19a extending through the guide body 19 and allowed to relax so that the shoulders 25 will engage the shoulder 26 to limit the expansion of the actuating bellows 10 to prevent over expansion. The plunger 23 is provided with an extension 27 having a ball 28 formed on the outer end thereof which extends through a slot 60 provided at the upper side of the outer end of the control arm 29 and engages same for providing pressure thereagainst in the manner hereinafter described.

The control arm 29 is arranged to pivot about a pivot pin 30 carried thereon which provides a fulcrum point for the control arm.

The pin 30 extends through an elongated horizontal slot 32 provided through the upwardly extending mounting bracket 31 formed integrally with the lower wall of the housing section 2. An adjustment slide 33 extends about the mounting bracket 31, and has an elongated diagonal slot 34 formed therethrough through which the pin 30 extends. The adjustment bolt 35 is affixed to bracket 31 and extends through the upper end of slide 33. The adjustment slide 33 may be moved upwardly or downwardly about adjustment bolt 35 by rotation of the adjustment nut 36, thereby moving the pivot pin 30 longitudinally in the slot 32 to thereby vary the fulcrum point of the lever 29. After adjustment the lock nut 37 may be tightened down to retain same in adjusted position.

An access passage 38 is provided through the upper wall of the housing section 1 to permit adjustment of the fulcrum point in the manner hereinbefore described from exteriorly of the housing. After adjustment the closure plug 39 may be threaded into the passage 38.

A prime valve carrier body 40 is slidably disposed in a guide bore 41 provided in the housing section 1, the said guide bore 41 being closed at its upper end by a threaded plug 42.

A valve head 43 is provided on the lower end of the valve carrier body 40 which is arranged to close the valve passage 44 extending through the body 45 threaded into a passage through the lower wall of the housing section 2.

A carrier pin 46 is secured to the body 40 and extends outwardly thereof into the open slot 47 provided in the end of the arm 29. Upon adjustment of the pivot point of the pin 30 the open slot 47 moves longitudinally with reference to the pin 46 to compensate for such adjustment.

A second valve stem 48 has a valve head 49 secured at the lower end thereof which seats upwardly against the valve seat provided about the passage 50.

A guide rod 51 is made integral with, and extends downwardly from the valve head 49 and slidably extends into a guide bore 52. A tension spring 53 is arranged about the guide rod 51 and the upper end thereof is seated against the spring stop 54 and the lower end thereof is seated against the upper surface of the manifold passage 5, so that said spring is arranged to urge the valve 49 toward closed position.

An adjustment screw 55 is threadedly engaged through the actuating arm 29, and has a ball head 56 on the lower end thereof which engages the head 57 provided on the upper end of the valve stem 48. The opening point of the valve 49 may be adjusted by threading the adjustment screw 55 upwardly or downwardly with reference to the actuating arm 29. After adjustment the adjustment screw 55 may be locked in adjusted position by means of the lock nut 58. An access passage 59 is provided through the wall of the upper section 1 of the housing through which the aforesaid adjustment can be made.

The operation and function of the regulator hereinbefore described is as follows:

The actuating bellows 10 is sealed with a control volume of the same gas as is being regulated. The bellows 10, and all control bellows herein described, is charged and sealed at atmospheric pressure with said gas while in relaxed position and suspended in the gas which is to be regulated. The regulation bellows 18 within the active bellows 10 is adjusted to vary the control volume and hence the control gas density by means of the adjustment nut 20. The adjustment plug 13 is threaded inwardly or outwardly to regulate the spring tension in the bellows so that it will reside in its unstressed condition at the control point. The screw 55 is adjusted to adjust the seating pressure of the valve 49 to provide precise control for the valve seat compensation. The valve head 49 is held against the valve seat in passage 50 by the spring 53 and the upstream pressure entering through the passage 5. The primary valve head 43 is held against the seat at the upper end of valve passage 44 by the force of the bellows 10 applied through the control arm 29. The fulcrum point 30 is adjusted so that the lever arm 29 is in equilibrium with the valve 49 just ready to unseat and the bellows 10 in extended position with slight spring tension therein. At such point the valve head 43 will be resting against the seat about passage 44.

With the regulator in such condition, when a demand is placed upon the supply by opening a valve downstream of the passage 8 the pressure will drop in chamber 7 causing the bellows 10 to expand. This pushes down on stem 27 thereby pivoting arm 29 about pivot pin 30, causing the screw 55 to push downwardly upon the valve stem 48 to push the valve head 49 off its seat against the spring tension 53. At the same time the carrier body 40 is moved upwardly, lifting valve head 43 off of the seat in the upper end of passage 44. Thereby upstream high pressure gas is admitted through both passages 44 and 50 simultaneously which subjects the exterior of bellows 10 to high pressure gas, causing same to contract and allowing the spring 53 to relax to close the valve 49 and pivot the arm 29 upwardly to simultaneously close the valve 43.

In the absence of the primary valve 43 gas would be allowed to bleed through the valve seat 49 before the valve is fully opened, thus preventing uniform regulation. By virtue of the mechanical opening of the valve 43 simultaneously with the cracking of the valve 49, full upstream pressure is released in chamber 7 and applied to the bellows 10 to cause instant response. Since the bellows 10 is charged with the same gas as that being admitted the volume of gas in the bellows 10 retains the same temperature and is equalized in pressure to the gas passing therethrough, and the density of the gas passing through the regulator is uniform.

FIRST ALTERNATE FORM

A first alternate form of the regulator is shown in the attached FIG. II, which has essentially the same functions and advantages hereinbefore described.

As shown in FIG. II the regulator device includes an upper body portion 61 and a lower body portion 62 which are joined together by the bolt 63 in sealed relationship by a resilient gasket 64, which provides an interior hollow portion 65.

An inlet passage 66 for high pressure gas communicates with the hollow portion 65 through the valve passage 76.

A low pressure gas outlet passage 67 communicates with the hollow interior portion 65. A thin walled metallic bellows diaphragm 68 is sealingly engaged to the upper closure plate 69 which is an integral part of the support body 70. The support body 70 movably extends into a bore 70a provided in the body section 61 and has seal rings 82 provided thereabout which slidably and sealingly engage between the inner wall of the bore 70a and the outer surface of the support body 70.

The lower end of the bellows 68 is sealingly closed by a lower plate 71. A valve stem 72 has a ball 73 provided on the upper end thereof which seats in a socket 74 provided on the lower surface of the plate 71.

A valve head 75 is attached to the lower end of the stem 72 and is arranged to seat against and close the valve passage 76. A guide stem 77 extends downwardly from the valve head 75. The guide stem 77 slidably extends into the counterbore 78 provided in the upper face of the lower wall of the housing section 62. The spring 79 is disposed between the spring stop 80 and the upper surface of the lower wall of the housing section 62, and urges the valve head 75 into closed position.

An adjustment plug 81 is threadedly engaged in a passage extending through the upper end of the housing section 61 and engages the upper end of the support body 70. The volume of the bellows 68 may be adjusted by threading the plug 81 inwardly or outwardly to thereby either contract or expand the bellows 68 and to adjust the opening point of the valve 75. Plug 81 may be made integral with body 70, if desired.

The valve plate member 84, having valve passage 76 therethrough, is secured to the lower wall of the lower housing section 62 by means of bolts 83 and said passage is sealed about by a gasket 85 compressed between such plate and the recess provided in the upper surface of said lower wall of the housing 62.

As shown, the adjustment plug 81 is employed to adjust the bellows 68 so that the bellows is in relaxed position, with the valve 72 just ready to unseat against force of the spring 79. As in the preferred form the bellows 68 is filled with the same gas as that being regulated.

Upon the pressure dropping in chamber 65 by reason of a demand downstream caused by opening of a valve the bellows 68 is caused to expand pushing downwardly on the valve stem 72, pushing valve head 75 off the seat, opening passage 76, and allowing high pressure gas to enter the chamber 65. Increase in pressure contracts the bellows 68 which allows the spring 79 to then close the valve 75, thereby throttling the valve and controlling the density of gas passing therethrough. As in the preferred form the density of the gas passing therethrough remains constant because of the corresponding gas within the bellows 68 which remains at the same temperature and pressure as the gas in chamber 65.

SECOND ALTERNATE FORM

A simplified alternate form of the invention is shown in FIG. III wherein numeral 86 indicates a lower valve housing and the numeral 87 indicates an upper valve housing which are joined together by threaded engagement indicated at 86a.

A high pressure supply line 88 communicates with the interior of the lower valve housing 86 to admit high pressure gas thereto. A valve seat 89 is secured at the upper end of the lower housing 86, and the valve ball 90 is arranged to seat thereagainst. The valve ball 90 is urged against the seat by the spring 91.

An actuating bellows 92 is hermetically sealed with the same type of gas being regulated disposed therein, and contacts at its lower end the guide head 93 slidably disposed in the bore of the upper housing 87, and contacts at its upper end the adjustment body 98. Flutes 97 are formed in the surface of head 93 to cause communication between chamber 92a and valve passage 95.

A valve actuating stem 94 is secured to and extends downwardly into the valve passage 95 and is arranged to contact the valve ball 90 to move same off its seat in the manner hereinafter described.

A low pressure discharge line 96 communicates with a downstream meter or regulator device.

Seal rings 99 are disposed in appropriate grooves surrounding the adjustment body 98 and slidably and sealingly engage the inner surface of the bore of the upper housing 87.

Upon a demand being placed upon the regulator by opening a valve downstream of the discharge line 96 the pressure is lowered which is communicated to the chamber 92a surrounding the bellows 92, thereby causing expansion of the bellows 92, pushing downwardly upon the control head 93 thereby pushing the valve ball 90 off the seat 89, admitting high pressure through flutes 97 to the exterior of bellows 92, causing same to contract, to allow the spring 91 to push the valve ball 90 into seating position, thus causing the valve to throttle and regulating the pressure and density of the discharged gas.

The bellows 92 may be adjusted by the adjustment plug 100 which is threadedly engaged in the upper end of the housing section 87, thereby regulating the density and pressure of the discharged gas.

THIRD ALTERNATE FORM

A third alternate form of the invention is shown in FIG. IV of the drawing. An intake manifold 101 is threadedly attached to a high pressure supply conduit 127. A plurality of passages 102 are provided through the manifold 101 through which incoming high pressure fluid may pass.

A valve passage 103 is formed through the lower end of a hollow manifold 108, providing a valve seat on the lower end thereof against which the valve head 104 may be seated. The valve head 104 is urged against the seat to close the passage 103 by means of a spring 105 which surrounds the valve carrier body 106 and is abutted against the valve head 104 and a shoulder 101a, provided internally of the manifold 101. The valve carrier body 106 is slidably disposed in a guide bore 107 provided centrally of the intake manifold body 101. The intake manifold 101 is threadedly connected to the orifice manifold 108 by threads 109 and is sealed thereabout by a resilient gasket 110 compressed between the surfaces thereof.

A push rod 111 has flutes 111a formed thereabout, providing peripheral passages 132 thereabout. Flutes 111a centrally align push rod 111 in manifold 108. The push rod 111 contacts the upper end of the valve head 104 through the passage 103 and is secured at its upper end to the thrust plate 113. The sealed bellows 114, which has sealed therein the same type of fluid being regulated, is secured to the thrust plate 113 at the lower end thereof and to the backup plate 115 at the upper end thereof as by welds 116. The orifice manifold 108 surrounds the bellows diaphragm 114 and is secured to the exhaust manifold 117 as by welding 118, forming a chamber 133 surrounding the bellows.

A threaded integral extension 119 of the backup plate 115 is threadedly engaged centrally of the adjustment slide 120.

The adjustment ball 121 is integrally formed on the outer end of the adjustment screw 122 which threadedly extends through a boss 117a provided on the valve carrier guide 117. The adjustment ball 121 on the outer end of the screw 122 slidably contacts the angled adjustment surface 123 so that upon the inward movement of the screw 122 the adjustment slide 120 may be moved downwardly to adjust the volume of the bellows 114 and the setting of the valve 104. The adjustment screw 121 may be locked in place after adjustment by the Allen locking screw 124, and after adjustment, the bore through boss 117a may be closed by a threaded cover 125. The manifold 117 is threadedly attached to the low pressure outlet conduit 128.

The adjustment slide 120 has a plurality of longitudinal passages 120a formed on the outer surface thereof to allow communication between the chamber 133 and the outlet conduit 128.

A description of the function of the alternate form shown in FIG. IV is as follows:

The spring 105 normally biases the valve head 104 into closed position against the seat provided about the lower end of passage 103 against the pressure in the chamber 129 inside the bellows 114.

When a demand is placed upon the regulator by the opening of a valve or other device downstream of the regulator, the bellows 114 responds to a drop in pressure in the chamber 133 by an expansion of the control volume of gas in the chamber 29 which causes an expansion of bellows 114, pushing down on the push rod 111 against the valve head 104, moving the valve head off the seat, admitting high pressure gas from the upstream pressure source through the conduit 127, and allowing same to enter through the valve passage 103 into the chamber 133, surrounding the bellows 114, thereby causing gas to be expelled through passages 120a and outlet conduit 128. The momentary rise in pressure in chamber 133 causes contraction of the bellows 114, lifting push rod 111 upwardly, allowing the spring 105 to move the valve head 104 to seated position across the valve passage 103 to isolate high pressure from the chamber 133. Thus, the density and pressure of the fluid delivered through outlet conduit 128 is regulated as hereinbefore described.

Other and further embodiments of the invention may be devised without departing from the spirit and scope of the appended claims.

Having described my invention I claim:

1. In a regulator, a hollow housing having an inlet for high pressure fluid and an outlet for low pressure fluid; an outwardly opening first valve in the housing openable toward the inlet; spring means biasing the first valve toward closed position; an inwardly opening second valve controlling admission of high pressure fluid from the inlet to the interior of the housing; a sealed control bellows diaphragm in the housing; actuating means contacting one end of the bellows arranged to move each valve off its seat upon expansion of the bellows; adjustable means in the housing contacting the other end of the bellows arranged to be moved inwardly and outwardly of the housing to adjust the contraction of the bellows; the exterior of the bellows being in constant communication with the outlet; a fulcrum arm pivotally mounted between the first and second valves, arranged to be pivoted about the pivot point therefor upon expansion of the bellows to cause simultaneous opening of the first and second valves; means to adjust the pivot point longitudinally with reference to the first and second valves.

2. The combination called for in claim 1 wherein the bellows is charged with the same type of fluid being regulated.

3. The combination called for in claim 1 with the addition of means to vary the volume of the bellows.

4. The combination called for in claim 3 wherein the means to vary the volume of the bellows comprises an adjustment bellows mounted inside of the control bellows; and adjustment means secured to one end of the adjustment bellows arranged to be moved inwardly and outwardly of the housing to adjust the compression of the adjustment bellows.

5. The combination called for in claim 1 with the addition of means to adjust the contacting relationship between the arm and the outwardly opening valve.

6. In a regulator for regulating the density of gaseous fluid passing from a high pressure stream to a low pressure stream; a hollow housing, a high pressure inlet communicating with the housing; a low pressure outlet communicating with the housing; an outwardly opening check valve between the high pressure inlet and the low pressure outlet; spring means biasing the outwardly opening valve against the seat therefor; a bellows diaphragm suspended in the housing which is charged with the same type of gaseous fluid as that being regulated; means to regulate the volume of the bellows diaphragm; an inwardly opening valve communicating between the high pressure inlet and the interior of the housing; an arm pivotally attached in the housing with the pivot point therefor located between the said valves; means to adjust the pivot of the arm longitudinally of the arm to adjust the fulcrum point of the arm, to thereby adjust the opening points of the respective valves; actuating means attached to the bellows contacting one end of the arm; contacting means between the arm and the outwardly opening valve to open same when the said arm is pivoted toward said valve; means carried by the other end of the arm engageable with the inwardly opening valve to move same off its seat when the first named end of the arm is pivoted toward the outwardly opening valve.

7. The combination called for in claim 6 wherein the contacting means is adjustable with relation to the arm to adjust the opening pressure of the outwardly opening valve.

8. The combination called for in claim 6 with the addition of means to adjust the compression of the bellows.

9. The combination called for in claim 6 with the addition of means to limit the expansion of the bellows.

10. In a density regulator, a hollow housing having an inlet for high pressure fluid and an outlet for low pressure fluid; an outwardly opening valve in the housing openable toward the inlet; an inwardly opening valve controlling admission of high pressure fluid from the inlet to the interior of the housing; a sealed control bellows diaphragm in the housing, said bellows being constructed of heat conductive material and charged with fluid having a gas constant equal to the gas constant of the fluid in the housing; a fulcrum arm pivotally mounted between the outwardly opening valve and the inwardly opening valve; pivot means securing said fulcrum arm to said housing; means to adjust the pivot means longitudinally with reference to the outwardly opening valve and the inwardly opening valve; and actuating means contacting one end of the bellows and said fulcrum arm arranged to simultaneously move the outwardly opening valve and the inwardly opening valve upon expansion of the bellows, the exterior of the bellows being in constant communication with the outlet.

11. The combination called for in claim 10 with the addition of means to adjust the contacting relationship between the arm and the outwardly opening valve.

* * * * *